(12) United States Patent
Harada et al.

(10) Patent No.: US 7,260,881 B2
(45) Date of Patent: Aug. 28, 2007

(54) METHOD FOR MANUFACTURING A STATOR CORE FOR A DYNAMOELECTRIC MACHINE

(75) Inventors: Yoshihiro Harada, Tokyo (JP); Susumu Hatano, Tokyo (JP); Kensaku Kuroki, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/354,943

(22) Filed: Feb. 16, 2006

(65) Prior Publication Data

US 2006/0130314 A1 Jun. 22, 2006

Related U.S. Application Data

(62) Division of application No. 10/430,327, filed on May 7, 2003, now abandoned.

(30) Foreign Application Priority Data

May 16, 2002 (JP) ............................. 2002-141474

(51) Int. Cl.
*H02K 15/02* (2006.01)
(52) U.S. Cl. .............................. 29/596; 29/598; 29/607
(58) Field of Classification Search ................. 29/596, 29/597, 598, 607, 609, 732; 310/201, 217, 310/218, 258, 259, 260
See application file for complete search history.

(56) References Cited

U.S. PATENT DOCUMENTS 2,221,618 A * 11/1940 Stikney ..................... 29/609 X
3,436,812 A * 4/1969 Aoki et al. ..................... 29/596
3,842,493 A * 10/1974 Ohuchi et al. ................ 29/596
4,102,040 A * 7/1978 Rich ............................ 29/598
6,337,529 B1 1/2002 Higashino et al.
6,346,758 B1 2/2002 Nakamura

FOREIGN PATENT DOCUMENTS

| EP | 1 139 541 A | 10/2001 | |
|---|---|---|---|
| JP | 54-42611 | 4/1979 | |
| JP | 55-13627 | * 1/1980 | .................. 29/598 |
| JP | 63-80741 | 4/1988 | |
| JP | 2001-112197 A | 4/2001 | |
| JP | 2001-211619 A | 8/2001 | |

* cited by examiner

*Primary Examiner*—A. Dexter Tugbang
(74) *Attorney, Agent, or Firm*—Sughrue Mion, PLLC

(57) ABSTRACT

A method of manufacturing a stator core for a dynamoelectric machine, by preparing a cylindrical laminated body by winding into a helical shape a continuous first sheet formed by press-punching from a first magnetic steel sheet material. Preparing a plurality of second sheets having a predetermined length by press-punching from a thicker second magnetic steel sheet material. Next, chamfered portions are formed on edge portions of second recess portions by chamfering the second sheet. Then, the second sheets are bent into an annular shape and the second sheets bent into the annular shape are stacked on both axial ends of the laminated body and integrated by laser welding.

6 Claims, 9 Drawing Sheets

METHOD FOR MANUFACTURING A STATOR CORE FOR A DYNAMOELECTRIC MACHINE

This is a divisional of application Ser. No. 10/430,327 filed May 7, 2003 now abandoned. The entire disclosure of the prior application, application Ser. No. 10/430,327 is considered part of the disclosure of the accompanying divisional application and is hereby incorporated by reference.

BACKGROUND OF THE INVENTION

1. Field of the Invention

The present invention relates to a method for manufacturing a stator core for a dynamoelectric machine such as an automotive alternator, for example, and particularly to a method for manufacturing a stator core formed by laminating a press-formed magnetic steel sheet material.

2. Description of the Related Art

Figure 8:
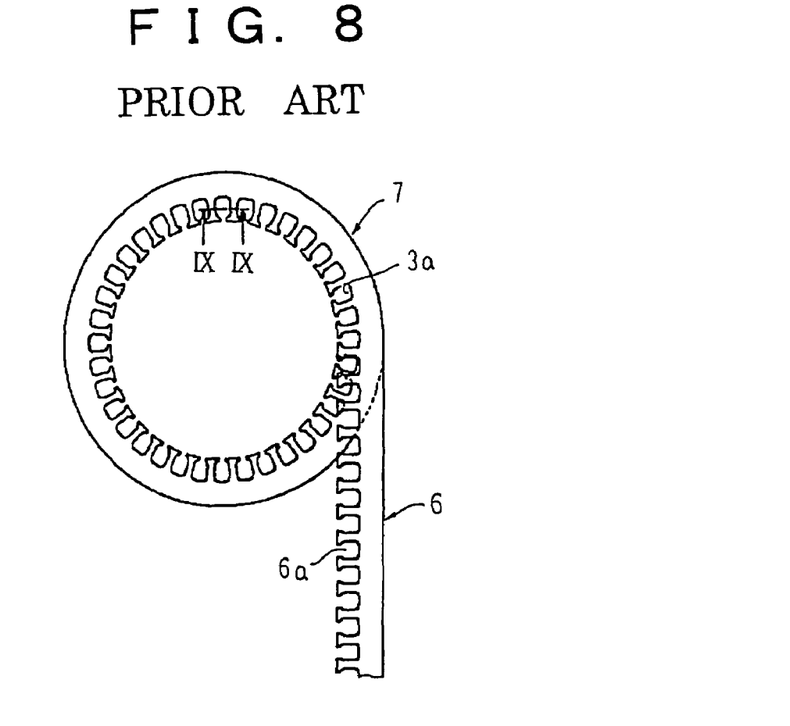
FIG. 8 is a plan explaining a process for forming a laminated body by a first sheet in a conventional stator for an automotive alternator.
Figure 9:
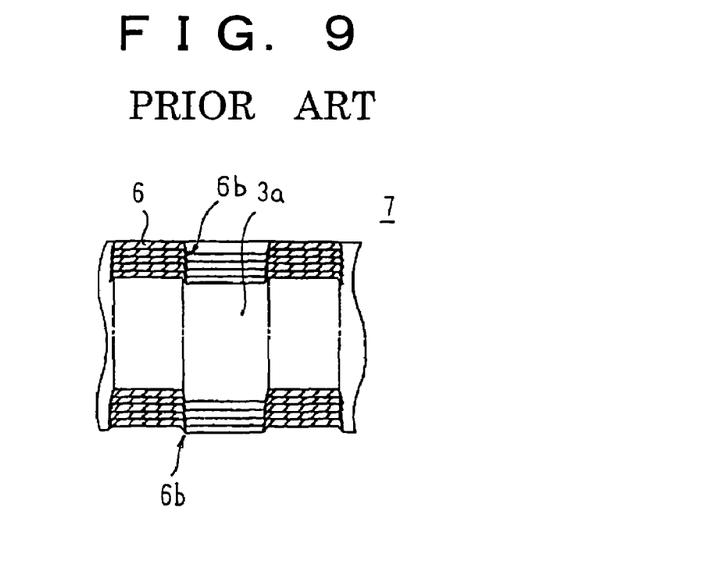
FIG. 9 is a cross section taken along line IX-IX in FIG. 8 viewed from the direction of the arrows.
Figure 10:
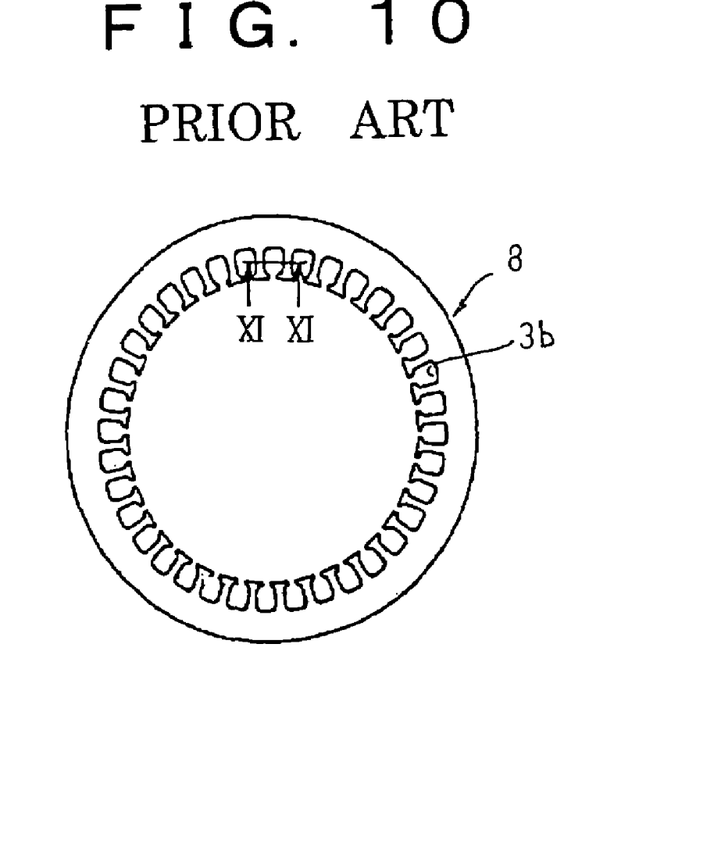
FIG. 10 is a plan showing a second sheet in the conventional stator for an automotive alternator.
Figure 11:
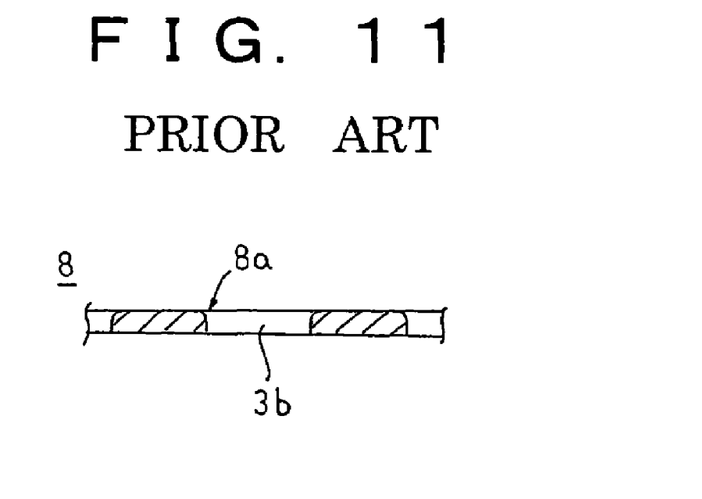
FIG. 11 is a cross section taken along line XI-XI in FIG. 10 viewed from the direction of the arrows.
Figure 12:
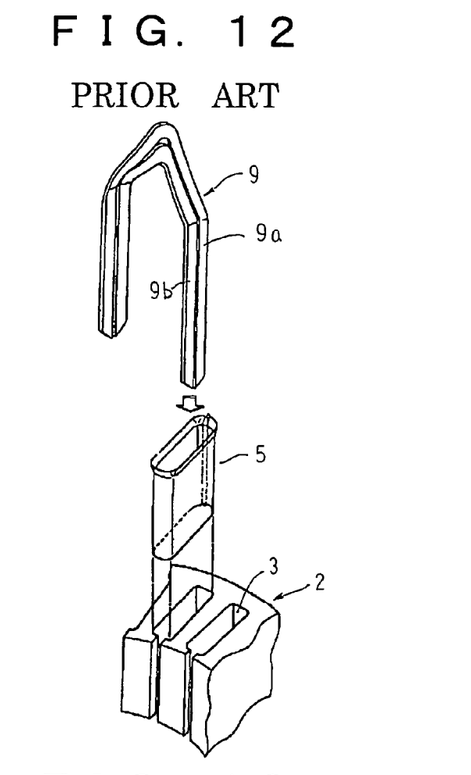
FIG. 12 is an exploded perspective showing a process for inserting conductor segments into a stator core in the conventional stator for an automotive alternator.
Figure 13:
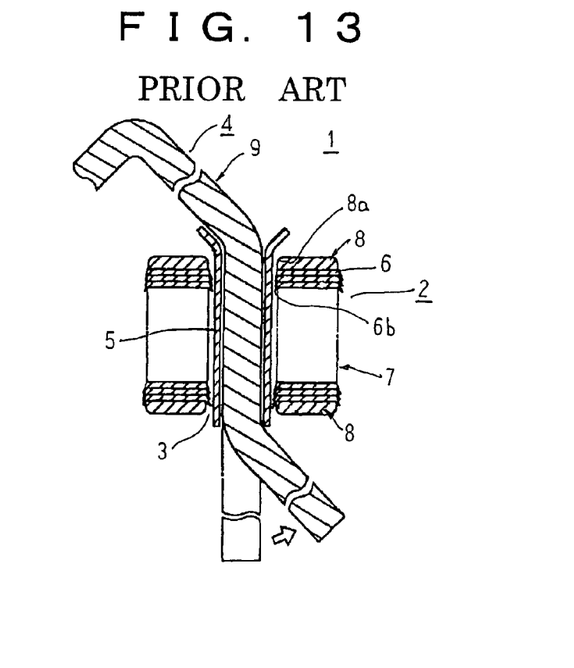
FIG. 13 is a partial cross section explaining a mounted state of a stator winding in the conventional stator for an automotive alternator.

FIG. 8 is a plan explaining a process for forming a laminated body by a first sheet in a conventional stator for an automotive alternator described in Japanese Patent Laid-Open No. 2001-112197 (Gazette), for example, FIG. 9 is a cross section taken along line IX-IX in FIG. 8 viewed from the direction of the arrows, FIG. 10 is a plan showing a second sheet in the conventional stator for an automotive alternator, FIG. 11 is a cross section taken along line XI-XI in FIG. 10 viewed from the direction of the arrows, FIG. 12 is an exploded perspective showing a process for inserting conductor segments into a stator core in the conventional stator for an automotive alternator, and FIG. 13 is a partial cross section explaining a mounted state of a stator winding in the conventional stator for an automotive alternator.

A conventional stator 1 is constituted by: a cylindrical stator core 2 in which slots 3 are formed at a predetermined pitch in a circumferential direction so as to open onto an inner circumferential side; a stator winding 4 installed in the slots 3 of the stator core 2; and insulators 5 mounted inside each of the slots 3.

The stator core 2 is provided with: a laminated body 7 constituted by a first sheet 6; and second sheets 8 disposed at first and second axial ends of the laminated body 7.

As shown in FIG. 8, the laminated body 7 is formed into a cylindrical shape by winding up the first sheet 6 for a predetermined number of winds into a helical shape, the first sheet 6 being formed by using a press die to punch recess portions 6a at a predetermined pitch in a strip-shaped magnetic steel sheet material. Here, the recess portions 6a are superposed in an axial direction of the laminated body 7, constituting first slot portions 3a. In the laminated body 7, the first sheet 6 is laminated with the press punch direction aligned, as shown in FIG. 9, and burrs 6b extending in the press punch direction remain on each layer of the first sheet 6 on inner wall surfaces of the first slot portions 3a.

As shown in FIG. 10, the second sheets 8 are each formed into an annular shape by using a press die to punch a flat sheet composed of a magnetic steel sheet material having a sheet thickness greater than that of the first sheet 6. Here, second slot portions 3b corresponding in position to the first slot portions 3a are simultaneously press-formed. As shown in FIG. 11, chamfered portions 8a are formed on edge portions of the second slot portions 3b on a first end side of the second sheets 8. Moreover, the second sheets 8 are formed so as to be equal in diameter to the laminated body 7.

The second sheets 8 are disposed at first and second end surfaces of the laminated body 7 such that the positions of the first slot portions 3a and the second slot portions 3b align and the chamfered portions 8a face away from the laminated body 7, and the stator core 2 is prepared by applying several strips of laser welding so as to extend in an axial direction from a first end portion to a second end portion on the outer circumferential surfaces thereof Moreover, the first and second slot portions 3a and 3b align in an axial direction, constituting the slots 3.

As shown in FIGS. 12 and 13, the stator winding 4 is constructed using a plurality of conductor segments 9 by joining together end portions of the conductor segments 9 by a joining method such as welding, etc. The conductor segments 9 are each prepared by bending into a U shape a short length of copper wire having an electrically-insulating coating. Here, large and small first and second conductor segments 9a and 9b form a basic unit and a plurality of these units are used. The conductor segments 9 are housed in the slots 3 so as to be surrounded by the insulators 5 such that the insulators 5 are interposed between the conductor segments 9 and inner wall surfaces of the slots 3. Together with the electrically-insulating coating covering the copper wire of the conductor segments 9, these insulators 5 ensure electrical insulation between the conductor segments 9 and the stator core 2.

The conductor segments 9 and the insulators 5 are inserted into the slots 3 of the stator core 2 in a direction aligned with the press punch direction of the first sheet 6, in other words, from top to bottom in FIG. 13. The stator winding 4 is prepared by bending first end portions of the conductor segments 9 extending outward from the slots 3 of the stator core 2 as indicated by the arrow in FIG. 13 and joining the first end portions to second end portions of conductor segments 9 separated by a predetermined pitch.

In the conventional stator 1 constructed in this manner, because the second sheets 8 having a thick sheet thickness are disposed on the first and second axial end portions of the laminated body 7, the rigidity of the stator core 2 is increased. Thus, the occurrence of deformation and peeling of the first sheet 6 having a thin sheet thickness is prevented during insertion of the conductor segments 9. When the stator 1 is fixed by being held from first and second axial ends by a frame, the occurrence of warping in outer circumferential portions of the stator core 2 is reliably prevented. Because the rigidity of the stator core 2 is increased, the sheet thickness of the first sheet 6 constituting the laminated body 7 can be reduced. Thus, iron loss which is proportional to the square of the sheet thickness of the steel sheets is reduced, enabling increased efficiency to be achieved in the dynamoelectric machine.

Because opening edge portions of the slots 3 at the first and second axial end surfaces of the stator core 2 are constituted by the chamfered portions 8a of the second sheets 8, damage to the electrically-insulating coating of the conductor segments 9 caused by the burrs 6b is avoided during insertion of the conductor segments 9, during bending or joining of the end portions of the conductor segments 9, and during shaping of coil ends of the stator winding 4 after joining of the conductor segments 9, thereby improving electrical insulation.

In the conventional stator for an automotive alternator, because the stator core 2 is prepared, as described above, by preparing the laminated body 7 by winding the strip-shaped first sheet 6 in which the recess portions 6a (the first slot portions 3a) are formed by press-punching into a helical shape for a predetermined number of winds, preparing the thick annular second sheets 8 in which the second slot portions 3*b* are formed by press-punching, forming the chamfered portions 8*a* on the edge portions of the second slot portions 3*b* of the second sheets 8 by chamfering, disposing the faced second sheets 8 at first and second ends of the laminated body 7, and integrating the laminated body 7 and the second sheets 8 by welding, the following problems arise, preventing cost reductions:

First, because the annular second sheets 8 are prepared from a flat magnetic steel sheet material by press-punching, the second sheets 8 cannot be prepared from the magnetic steel sheet material efficiently, increasing the amount of magnetic steel sheet material.

Second, because the chamfered portions 8*a* are formed on the edge portions of the second slot portions 3*b* by chamfering the annular second sheets 8, slot opening portions are narrow, lowering chamfering precision, thereby lowering yield.

SUMMARY OF THE INVENTION

The present invention aims to solve the above problems and an object of the present invention is to provide a method for manufacturing a stator core for a dynamoelectric machine enabling cost reductions to be achieved by preparing a second sheet constituting an end plate in a straight shape by press-punching and preparing an annular end plate by bending the straight second sheet to prepare the end plate from a magnetic steel sheet material efficiently and suppress increases in material quantities, and in addition, by forming an chamfered portion on an edge portion of a recess portion by chamfering the straight second sheet to increase chamfering precision and enable improved yield.

With the above object in view, according to one aspect of the present invention, there is provided a method for manufacturing a stator core for a dynamoelectric machine, the method including the step of preparing a cylindrical laminated body by preparing a continuous first sheet in which first recess portions are formed at a predetermined spacing by press-punching from a strip-shaped first magnetic steel sheet material and winding the first sheet into a helical shape such that the first recess portions are superposed in an axial direction. Also, the method includes the step of preparing a second sheet having a predetermined length in which second recess portions are formed at a predetermined spacing by press-punching a second magnetic steel sheet material having a sheet thickness greater than that of the first magnetic steel sheet material. Further, the method includes the steps of bending the second sheet into an annular shape, stacking the second sheets bent into the annular shape on both axial ends of the laminated body such that the second recess portions are superposed on the first recess portions in an axial direction, and integrating the laminated body and the second sheets stacked together by applying several strips of welding on an outer circumferential surface of the laminated body and the second sheets so as to extend from a first end to a second end in an axial direction.

Therefore, the method enables the second sheet for an end plate to be prepared from the second magnetic sheet material efficiently, thereby enabling cost reduction to be achieved.

DETAILED DESCRIPTION OF THE PREFERRED EMBODIMENTS

Preferred embodiments of the present invention will now be explained with reference to the drawings.

Embodiment 1

Figure 1:
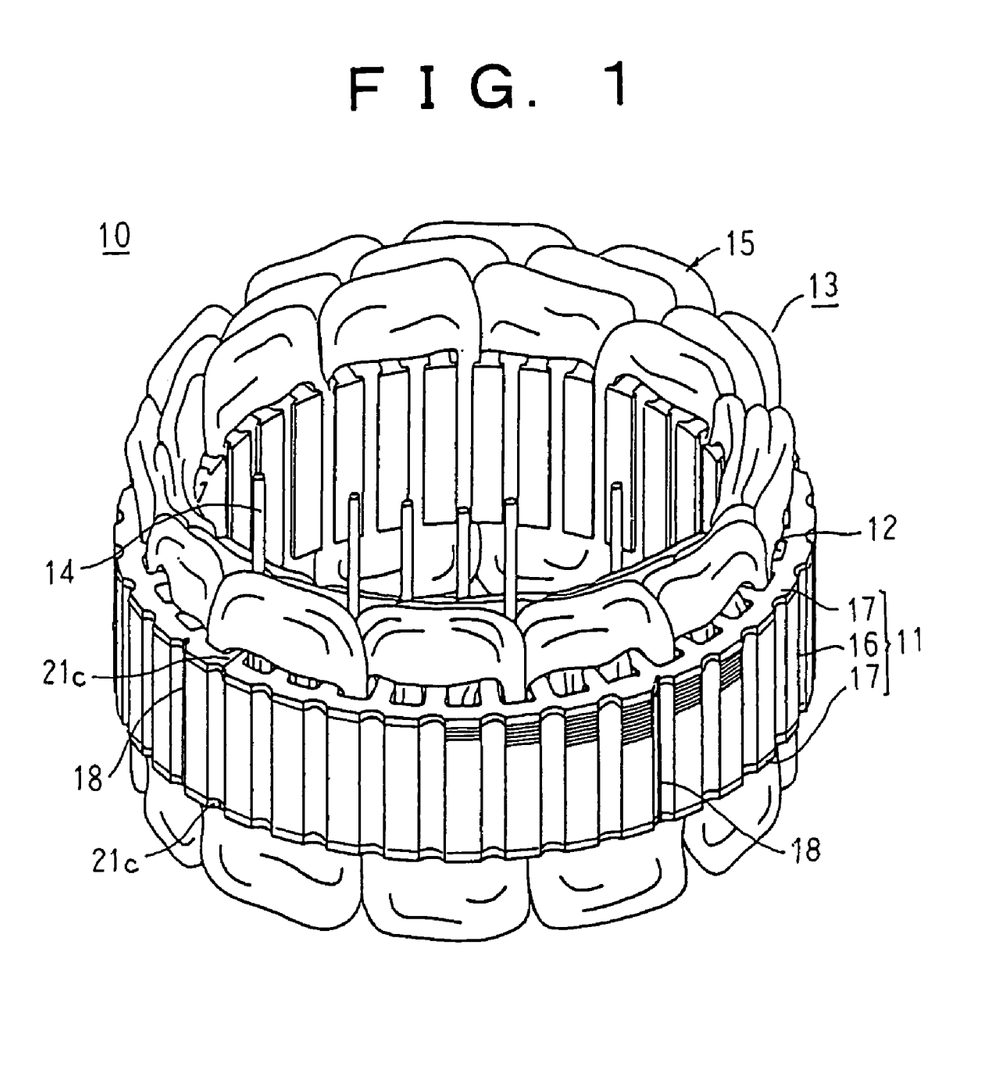
FIG. 1 is a perspective showing a stator for an automotive alternator using a stator core manufactured by a method for manufacturing a stator core according to Embodiment 1 of the present invention.
Figure 2:
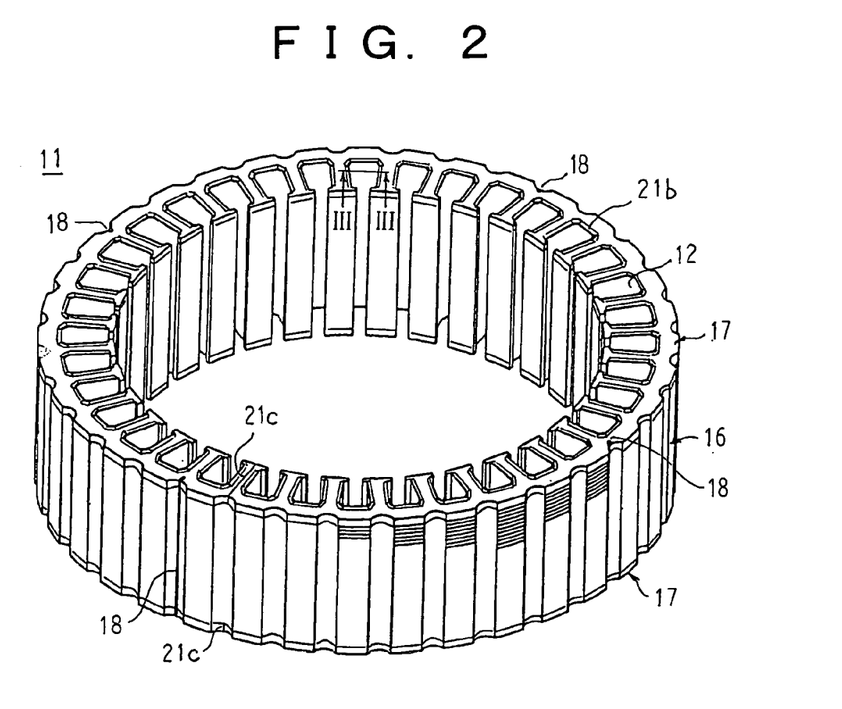
FIG. 2 is a perspective showing the stator core manufactured by the method for manufacturing a stator core according to Embodiment 1 of the present invention.
Figure 3:
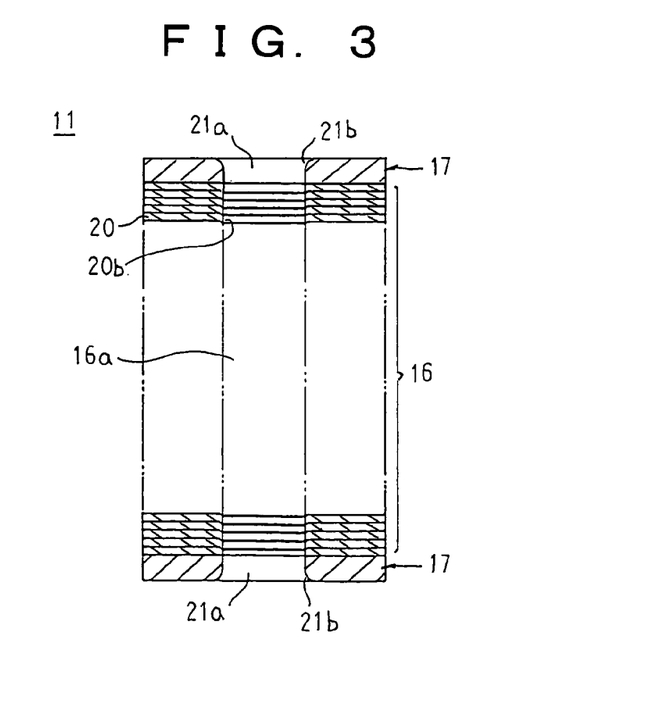
FIG. 3 is a cross section taken along line III-III in FIG. 2 viewed from the direction of the arrows.
Figure 4:
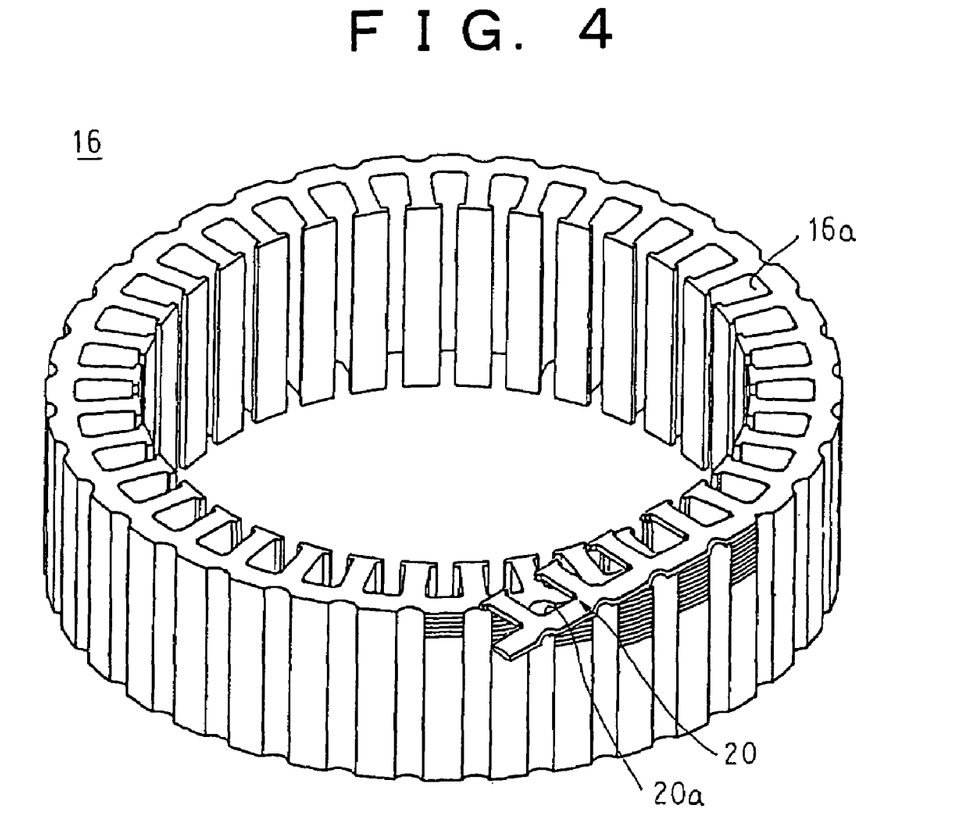
FIG. 4 is a perspective explaining the method for manufacturing a stator core according to Embodiment 1 of the present invention.
Figure 5:
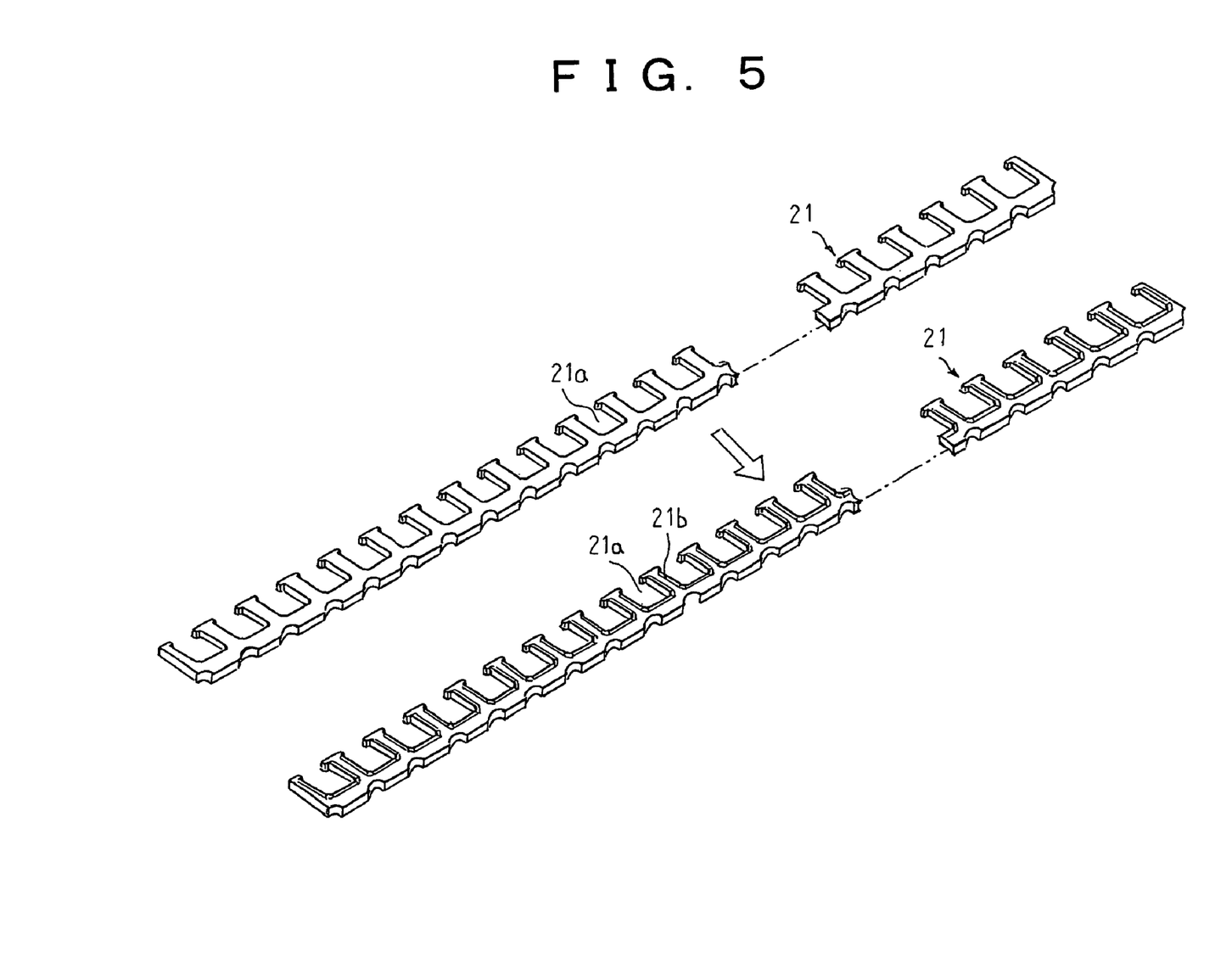
FIG. 5 is a perspective explaining the method for manufacturing the stator core manufactured by the method for manufacturing a stator core according to Embodiment 1 of the present invention.
Figure 6:
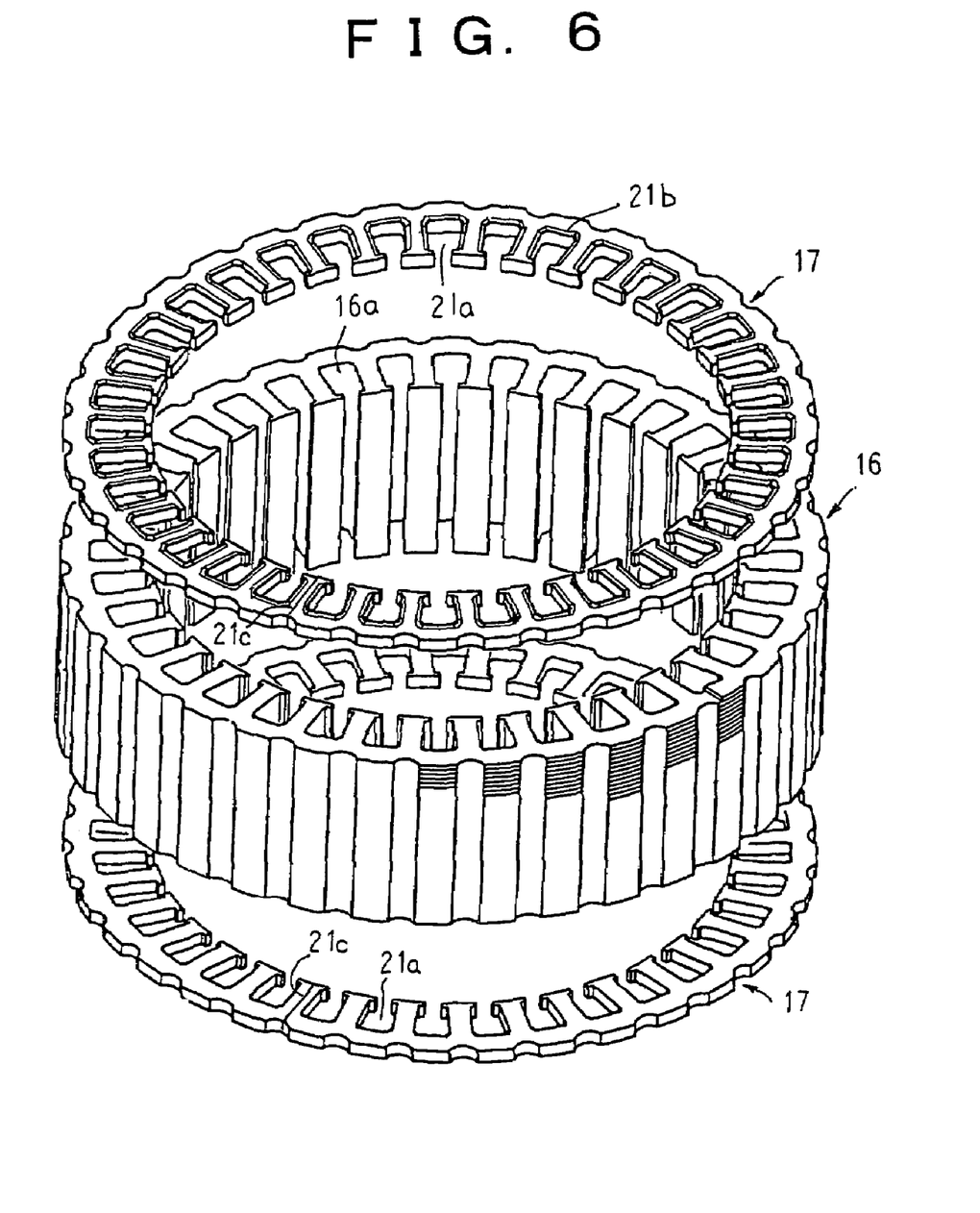
FIG. 6 is a perspective explaining the method for manufacturing the stator core manufactured by the method for manufacturing a stator core according to Embodiment 1 of the present invention.

FIG. 1 is a perspective showing a stator for an automotive alternator using a stator core manufactured by a method for manufacturing a stator core according to Embodiment 1 of the present invention, FIG. 2 is a perspective showing the stator core manufactured by the method for manufacturing a stator core according to Embodiment 1 of the present invention, FIG. 3 is a cross section taken along line III-III in FIG. 2 viewed from the direction of the arrows, and FIGS. 4 to 6 are perspectives explaining the method for manufacturing a stator core according to Embodiment 1 of the present invention.

In FIGS. 1 to 3, a stator 10 is constituted by: a cylindrical stator core 11 in which slots 12 are formed at a predetermined pitch in a circumferential direction so as to open onto an inner circumferential side; and a stator winding 13 installed in the slots 12 of the stator core 11.

The stator core 11 is constructed by laminating a pair of end plates 17 composed of a magnetic steel sheet onto first and second axial ends of a laminated body 16 formed by laminating a magnetic steel sheet material and integrating by laser welding, for example.

The stator winding 13 is prepared by mounting three winding phase portions 15 into groups of the slots 12 so as to be offset by one slot each, each winding phase portion 15 being formed by installing one conductor wire 14 composed of a copper wire coated with an electrical insulator into a wave winding in every third slot 12. Each of the winding phase portions 15 is formed by preparing an annular unit by winding one conductor wire 14 for a predetermined number of winds, preparing a star-shaped unit by shaping the annular unit into a star shape, and mounting the star-shaped unit into the slots 12 of the stator core 11.

Next, a method for manufacturing the stator core 11 will be explained.

First, a single-strip first sheet 20 in which first recess portions 20a are formed at a predetermined pitch is prepared by press-forming a hoop material composed of a first magnetic steel sheet material having a thickness of 0.50 mm, for example, using a press die. Then, as shown in FIG. 4, the cylindrical laminated body 16 is prepared by winding the first sheet 20 into a helical shape for a predetermined number of winds. At this time, the first recess portions 20a are superposed in an axial direction of the laminated body 16 to constitute the slots 16a.

Second sheets 21 having a predetermined length in which second recess portions 21a are formed at a predetermined pitch are each prepared by press-forming a flat plate composed of a second magnetic steel sheet material having a thickness of 1.00 mm, for example, using a press die. Here, the length of the second sheets 21 is equivalent to the circumferential length of the stator core 11. Next, as shown in FIG. 5, these straight second sheets 21 are faced using a press die to form chamfered portions 21b on edge portions of the second recess portions 21a on a first surface side of each of the second sheets 21. Then, the second sheets 21 formed with the chamfered portions 21b are each bent into an annular shape. In addition, annular end plates 17 are prepared by abutting first and second end surfaces of the second sheets 21 and joining the abutted portions 21c by tungsten inert-gas (TIG) welding.

Next, the pair of end plates 17, as shown in FIG. 6, are superposed onto the first and second axial end portions, respectively, of the laminated body 16 such that the chamfered portions 21b face outward and the second recess portions 21a are aligned with the slots 16a. The stator core 11 shown in FIG. 2 is prepared by applying several strips of laser welding (weld portions 18) on outer circumferential surfaces thereof so as to extend in an axial direction from the first end portion to the second end portion. Moreover, the slots 16a and the second recess portions 21a line up in an axial direction to constitute the slots 12.

As shown in FIG. 3, burrs 20b extending in the press punch direction remain on each layer of the first sheet 20 on inner wall surfaces of the slots 12 of the stator core 11. A powdered form of an electrically-insulating resin such as an epoxy resin, for example, is electrostatically coated onto the stator core 11, then melted by heating, the electrically-insulating resin being formed so as to cover the entire surface of the stator core 11.

In the stator 10 constructed in this manner, opening edge portions of the slots 12 at the first and second end surfaces of the stator core 11 are constituted by the chamfered portions 21b, and the burrs 20b formed by press-punching are present only inside the slots 12. Thus, damage to the electrically-insulating coating of the conductor wires 14 caused by the burrs 20b is avoided during mounting of the stator winding 13 and during shaping of coil ends of the stator winding 13, thereby improving electrical insulation.

Because end plates 17 having a thick sheet thickness are disposed on the first and second end portions of the stator core 11, the rigidity of the stator core 11 is increased. Thus, the occurrence of deformation and peeling of the first sheet 20 having a thin sheet thickness is prevented during insertion of the stator winding 13. When the stator 10 is fixed by being held from first and second axial ends by a frame, the occurrence of warping in outer circumferential portions of the stator core 11 is reliably prevented. In addition, because the rigidity of the stator core 11 is increased, the sheet thickness of the first sheet 20 constituting the laminated body 16 can be reduced. Thus, iron loss which is proportional to the square of the sheet thickness of the steel sheets is reduced, enabling increased efficiency to be achieved in the dynamoelectric machine.

Because the end plates 17 are prepared by joining together the abutted portions 21c of the second sheets 21 by TIG welding, magnetic flux can be passed through the end plates 17 effectively, enabling output to be stabilized.

Because the laminated body 16 constituting the stator core 11 is prepared by winding into a helical shape a single-strip first sheet 20 formed by pressing a hoop material composed of the first magnetic steel sheet material, the first sheet 20 can be prepared from the first magnetic steel sheet material efficiently, enabling the amount of magnetic material used to be reduced, thereby enabling cost reductions.

Because the end plates 17 constituting the stator core 11 are prepared by bending into an annular shape second sheets 21 having a predetermined length formed by pressing a flat plate composed of the second magnetic steel sheet material, then TIG welding the first and second end surfaces of the bent second sheets 21 placed in contact with each other, the second sheets 21 can be prepared from the second magnetic steel sheet material efficiently. In this case, five times as many end plates 17 can be prepared as when the annular end plates are press-formed directly from the second magnetic steel sheet material, significantly reducing the amount of magnetic material used, thereby enabling cost reductions. Furthermore, because the abutted portions 21c of the second sheets 21 are joined together, handling of the end plates 17 is facilitated when the end plates 17 are being superposed onto the laminated body 16, improving manufacture.

When the chamfered portions are formed by chamfering annular end plates, as in the related art, the slot opening portions are narrow, making it hard to perform high-precision chamfering, thereby reducing yield. According to Embodiment 1, because the chamfered portions 21b are formed on the edge portions of the second recess portions 21a by chamfering the straight second sheets 21, the slot opening portions are wide, making high-precision chamfering possible, thereby enabling reliability to be increased.

Moreover, in Embodiment 1 above, the abutted portions 21c of the second sheets 21 are joined together by TIG welding, but the abutted portions 21c of the second sheets 12 do not necessarily have to be joined together; the first and second end surfaces of the second sheets 21 constituting the abutted portions 21c through which magnetic flux flows need only be placed in contact with each other.

In Embodiment 1 above, the stator winding 13 is constructed by preparing annular units by winding single conductor wires 14 each composed of a copper wire coated with an electrical insulator for a predetermined number of winds, preparing star-shaped units by shaping the annular units into a star shape, and mounting the star-shaped units into the slots 12 of the stator core 11, but the stator winding is not limited to this construction and it goes without saying that the stator winding may also be constructed using the conductor segments 9 shown in the conventional technique.

In Embodiment 1 above, insulators are not mounted to the slots 12, but it goes without saying that insulators may be mounted to each of the slots 12.

Embodiment 2

Figure 7:
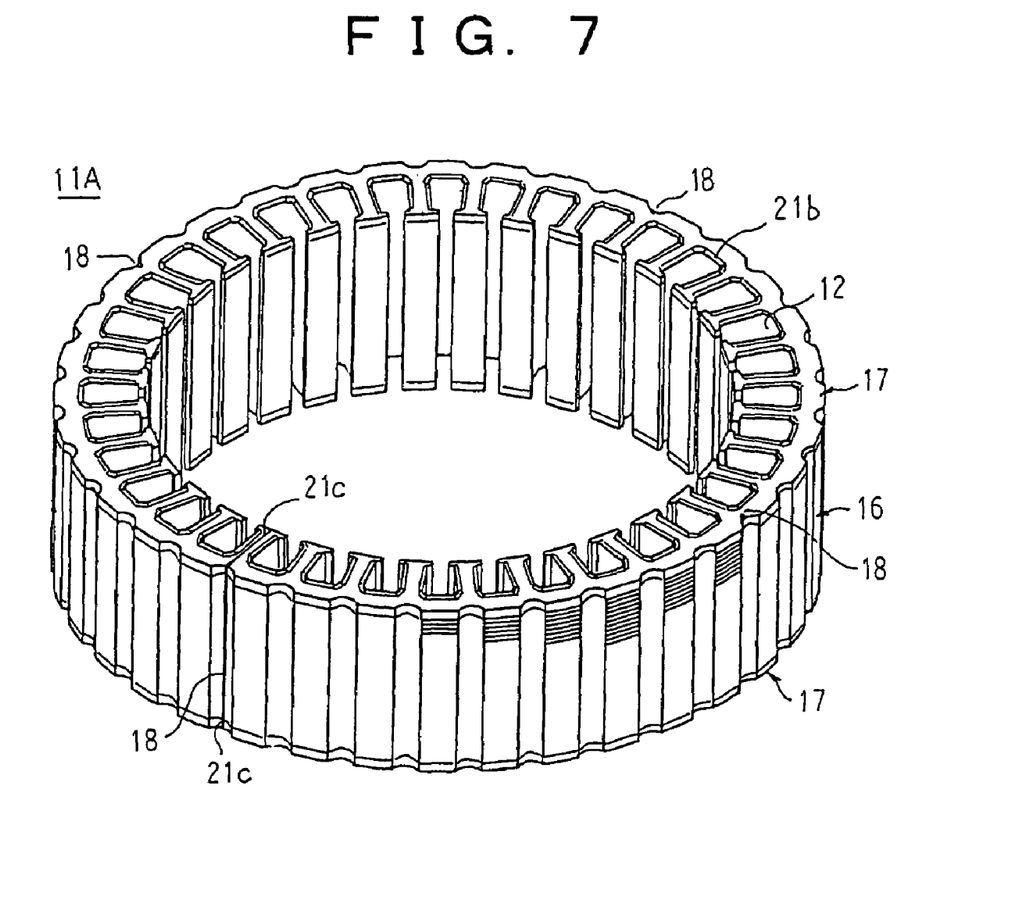
FIG. 7 is a perspective showing a stator core manufactured by a method for manufacturing a stator core according to Embodiment 2 of the present invention.

In a stator core 11A according to Embodiment 2, as shown in FIG. 7, the abutted portions 21c of the second sheets 21 constituting the end plates 17 are aligned with one of several strip-shaped weld portions 18 integrating the laminated body 16 and the end plates 17. In other words, the abutted portions 21c are joined together simultaneously when laser welding is applied in order to integrate the laminated body 16 and the end plates 17.

Moreover, the rest of this embodiment is constructed in a similar manner to Embodiment 1 above.

A method for manufacturing the stator core 11A will now be explained.

First, a single-strip first sheet 20 in which first recess portions 20a are formed at a predetermined pitch is prepared by press-forming a hoop material composed of a first magnetic steel sheet material having a thickness of 0.35 mm, for example, using a press die. Then, the cylindrical laminated body 16 is prepared by winding the first sheet 20 into a helical shape for a predetermined number of winds.

Second sheets 21 having a predetermined length in which second recess portions 21a are formed at a predetermined pitch are each prepared by press-forming a flat plate composed of a second magnetic steel sheet material having a thickness of 0.80 mm, for example, using a press die. Next, these second sheets 21 are faced using a press die to form chamfered portions 21b on edge portions of the second recess portions 21a on a first surface side of each of the second sheets 21. Then, the second sheets 21 formed with the chamfered portions 21b are each bent into an annular shape.

Next, the second sheets 21 which have been bent into an annular shape and in which the first and second end surfaces are abutted are superposed onto the first and second axial end portions, respectively, of the laminated body 16 such that the chamfered portions 21b face outward and the second recess portions 21a are aligned with the slots 16a. The stator core 11A shown in FIG. 7 is prepared by applying several strips of laser welding (weld portions 18) on outer circumferential surfaces thereof so as to extend in an axial direction from the first end portion to the second end portion. Here, one of the strips of laser welding is applied at the position of the abutted portions 21c of the second sheets 21. Thus, the second sheets 21 are joined together at the abutted portions 21c to form the end plates 17.

In addition, a powdered form of an electrically-insulating resin such as an epoxy resin, for example, is electrostatically coated onto the stator core 11A, then melted by heating, the electrically-insulating resin being formed so as to cover the entire surface of the stator core 11A.

Consequently, similar effects to those in Embodiment 1 above can also be achieved in Embodiment 2.

In Embodiment 2, because the abutted portions 21c of the second sheets 21 constituting the end plates 17 are joined together simultaneously when laser welding is applied to integrate the laminated body and the end plates, a single welding process is sufficient, thereby simplifying the manufacturing process.

Moreover, because the first and second end surfaces of the second sheets 21 in the end plates 17 are placed in contact at the abutted portions 21c, the flow of the magnetic flux is not inhibited. Furthermore, in addition to the outer circumferential surface of the second sheets 21, the abutted portions 21c may also be welded on the end surfaces on an opposite side from the laminated body 16 during laser welding. In that case, magnetic flux can be passed through the end plates 17 effectively, enabling output to be stabilized.

What is claimed is:

1. A method for manufacturing a stator core for a dynamoelectric machine, said method comprising:
    preparing a cylindrical laminated body by preparing a continuous first sheet in which first recess portions are formed at a predetermined spacing by press-punching from a strip-shaped first magnetic steel sheet material and winding said first sheet into a helical shape such that said first recess portions are superposed in an axial direction;
    preparing a plurality of second sheets having predetermined length in which second recess portions are formed at a predetermined spacing by press-punching from a second magnetic steel sheet material having a sheet thickness greater than that of said first magnetic steel sheet material;
    bending said second sheets into an annular shape;
    stacking said second sheets bent into the annular shape on both axial ends of said laminated body such that said second recess portions are superposed on said first recess portions in the axial direction;
    integrating said laminated body and said second sheets stacked together by applying several strips of welding on an outer circumferential surface of said laminated body and said second sheets so as to extend from a first end to a second end in the axial direction; and
    forming a chamfered portion along an entire edge portion of said second recess portions by chamfering said second sheets before the bending of said second sheets into the annular shape.

2. The method for manufacturing a stator core for a dynamoelectric machine according to claim 1, further comprising the step of joining together abutted portions of first and second end surfaces of said second sheets bent into the annular shape before the step of stacking said second sheets bent into the annular shape on said laminated body.

3. The method for manufacturing a stator core for a dynamoelectric machine according to claim 1, wherein abutted portions of said second sheets bent into the annular shape are joined together simultaneously by said welding during the step of integrating said laminated body and said second sheets.

4. The method of claim 1, wherein the second sheets are prepared separately from the cylindrical laminated body.

5. The method of claim 1, wherein each of said second sheets is bent individually.

6. The method of claim 1, wherein the second sheets is formed by press punching a strip-shaped magnetic steel sheet material.

* * * * *